US011706048B1

(12) United States Patent
Ngo et al.

(10) Patent No.: US 11,706,048 B1
(45) Date of Patent: Jul. 18, 2023

(54) MULTI-PROTOCOL BUS CIRCUIT

(71) Applicant: Qorvo US, Inc., Greensboro, NC (US)

(72) Inventors: Christopher Truong Ngo, Queen Creek, AZ (US); Nadim Khlat, Cugnaux (FR); Alexander Wayne Hietala, Phoenix, AZ (US)

(73) Assignee: Qorvo US, Inc., Greensboro, NC (US)

( * ) Notice: Subject to any disclaimer, the term of this patent is extended or adjusted under 35 U.S.C. 154(b) by 6 days.

(21) Appl. No.: 17/552,497

(22) Filed: Dec. 16, 2021

(51) Int. Cl.
*H04L 12/40* (2006.01)
*G06F 13/42* (2006.01)

(52) U.S. Cl.
CPC .... *H04L 12/40019* (2013.01); *G06F 13/4282* (2013.01); *H04L 12/40013* (2013.01); *H04L 12/40084* (2013.01)

(58) Field of Classification Search
CPC .................................................. G06F 9/5072
See application file for complete search history.

(56) References Cited

U.S. PATENT DOCUMENTS

| | | |
|---|---|---|
| 3,555,196 A | 1/1971 | Singer |
| 3,953,835 A | 4/1976 | Cuccio et al. |
| 4,336,447 A | 6/1982 | Oguchi et al. |
| 4,424,812 A | 1/1984 | Lesnick |
| 4,497,068 A | 1/1985 | Fischer |
| 4,736,367 A | 4/1988 | Wroblewski et al. |
| 5,412,644 A | 5/1995 | Herberle |
| 5,459,660 A | 10/1995 | Berra |
| 5,495,469 A | 2/1996 | Halter et al. |
| 5,499,247 A | 3/1996 | Matsuda et al. |
| 5,586,266 A | 12/1996 | Hershey et al. |
| 5,621,897 A | 4/1997 | Boury et al. |
| 5,684,803 A | 11/1997 | Nguyen Thuy |
| 5,734,847 A | 3/1998 | Garbus et al. |
| 5,748,675 A | 5/1998 | Hormel et al. |
| 5,774,680 A | 6/1998 | Wanner et al. |
| 5,787,132 A | 7/1998 | Kishigami et al. |

(Continued)

OTHER PUBLICATIONS

Non-Final Office Action for U.S. Appl. No. 14/575,491, dated May 26, 2017, 20 pages.

(Continued)

*Primary Examiner* — Henry Tsai
*Assistant Examiner* — Juanito C Borromeo
(74) *Attorney, Agent, or Firm* — Withrow & Terranova, P.L.L.C.

(57) ABSTRACT

A multi-protocol bus circuit is provided. The multi-protocol bus circuit includes multiple master circuits each configured to communicate a respective master bus command(s) via a respective one of multiple master buses based on a respective one of multiple master bus protocols, and a slave circuit(s) configured to communicate a slave bus command(s) via a slave bus based on a slave bus protocol that is different from any of the master bus protocols. To enable bidirectional bus communications between the master circuits and the slave circuit(s), the multi-protocol bus circuit further includes a multi-protocol bridge circuit configured to perform a bidirectional conversion between the slave bus protocol and each of the master bus protocols. As a result, it is possible to support bidirectional bus communications based on heterogeneous bus protocols with minimal impact on cost and/or footprint.

20 Claims, 3 Drawing Sheets

(56) References Cited

U.S. PATENT DOCUMENTS

| | | | |
|---|---|---|---|
| 5,832,207 | A | 11/1998 | Little et al. |
| 5,978,860 | A | 11/1999 | Chan et al. |
| 6,094,699 | A | 7/2000 | Surugucchi et al. |
| 6,141,708 | A | 10/2000 | Tavallaei et al. |
| 6,189,063 | B1 | 2/2001 | Rekeita et al. |
| 6,292,705 | B1 | 9/2001 | Wang et al. |
| 6,308,255 | B1 | 10/2001 | Gorishek, IV et al. |
| 6,310,408 | B1 | 10/2001 | Hermann |
| 6,360,291 | B1 | 3/2002 | Tavallaei |
| 6,397,279 | B1 | 5/2002 | Jaramillo et al. |
| 6,408,163 | B1 | 6/2002 | Fik |
| 6,484,268 | B2 | 11/2002 | Tamura et al. |
| 6,775,707 | B1 | 8/2004 | Bennett |
| 6,985,990 | B2 | 1/2006 | Bronson et al. |
| 7,197,589 | B1 | 3/2007 | Deneroff et al. |
| 7,519,005 | B2 | 4/2009 | Hejdeman et al. |
| 7,685,320 | B1 | 3/2010 | Wishneusky |
| 7,729,427 | B2 | 6/2010 | Kwok |
| 8,509,318 | B2 | 8/2013 | Tailliet |
| 8,694,710 | B2 | 4/2014 | Bas et al. |
| 9,152,598 | B2 * | 10/2015 | Fosse ............ G06F 13/4291 |
| 9,166,584 | B1 | 10/2015 | Kandala et al. |
| 9,252,900 | B2 | 2/2016 | Poulsen |
| 9,430,321 | B2 | 8/2016 | Slik |
| 9,519,612 | B2 | 12/2016 | Hietala et al. |
| 9,569,386 | B2 | 2/2017 | Du |
| 9,639,500 | B2 | 5/2017 | Bas et al. |
| 9,652,451 | B2 | 5/2017 | Elder |
| 9,690,725 | B2 | 6/2017 | Sengoku |
| 9,755,821 | B2 | 9/2017 | Jang et al. |
| 9,946,677 | B2 | 4/2018 | Hapke |
| 10,176,130 | B2 | 1/2019 | Ngo et al. |
| 10,185,683 | B2 | 1/2019 | Ngo et al. |
| 10,558,607 | B2 | 2/2020 | Ngo et al. |
| 10,599,601 | B1 | 3/2020 | Ngo et al. |
| 10,983,942 | B1 | 4/2021 | Ngo et al. |
| 2001/0050713 | A1 | 12/2001 | Kubo et al. |
| 2004/0049619 | A1 | 3/2004 | Lin |
| 2004/0100400 | A1 | 5/2004 | Perelman et al. |
| 2004/0128594 | A1 | 7/2004 | Elmhurst et al. |
| 2004/0221067 | A1 | 11/2004 | Huang et al. |
| 2005/0012492 | A1 | 1/2005 | Mihalka |
| 2005/0185665 | A1 | 8/2005 | Uboldi |
| 2005/0259609 | A1 | 11/2005 | Hansquine et al. |
| 2006/0031618 | A1 | 2/2006 | Hansquine et al. |
| 2006/0050694 | A1 | 3/2006 | Bury et al. |
| 2006/0152236 | A1 | 7/2006 | Kim |
| 2006/0236008 | A1 | 10/2006 | Asano et al. |
| 2007/0073449 | A1 | 3/2007 | Kraemer et al. |
| 2008/0217076 | A1 | 9/2008 | Kraemer et al. |
| 2009/0121825 | A1 | 5/2009 | Har |
| 2009/0248932 | A1 | 10/2009 | Taylor et al. |
| 2010/0305723 | A1 | 12/2010 | Koyama |
| 2010/0306430 | A1 | 12/2010 | Takahashi |
| 2011/0035632 | A1 | 2/2011 | Hong et al. |
| 2011/0113171 | A1 | 5/2011 | Radhakrishnan et al. |
| 2012/0027104 | A1 | 2/2012 | Bas et al. |
| 2012/0030753 | A1 | 2/2012 | Bas et al. |
| 2012/0226965 | A1 | 9/2012 | Hammerschmidt et al. |
| 2012/0303836 | A1 | 11/2012 | Ngo et al. |
| 2013/0054850 | A1 | 2/2013 | Co |
| 2013/0124763 | A1 | 5/2013 | Kessler |
| 2013/0128724 | A1 | 5/2013 | Farley et al. |
| 2013/0132624 | A1 | 5/2013 | Chen et al. |
| 2013/0166801 | A1 | 6/2013 | Chun et al. |
| 2013/0197920 | A1 | 8/2013 | Lesso et al. |
| 2013/0265884 | A1 | 10/2013 | Brombal et al. |
| 2013/0301689 | A1 | 11/2013 | Marchand et al. |
| 2014/0025999 | A1 | 1/2014 | Kessler |
| 2014/0112339 | A1 | 4/2014 | Safranek et al. |
| 2014/0281593 | A1 | 9/2014 | Hayes |
| 2014/0304442 | A1 | 10/2014 | Hietala et al. |
| 2014/0310436 | A1 | 10/2014 | Du |
| 2014/0376278 | A1 | 12/2014 | Fornage et al. |
| 2015/0056941 | A1 | 2/2015 | Lin et al. |
| 2015/0074306 | A1 | 3/2015 | Ayyagari et al. |
| 2015/0106541 | A1 | 4/2015 | Southcombe et al. |
| 2015/0127862 | A1 | 5/2015 | Fan et al. |
| 2015/0149673 | A1 | 5/2015 | Balkan et al. |
| 2015/0169482 | A1 | 6/2015 | Ngo et al. |
| 2015/0192974 | A1 | 7/2015 | Ngo et al. |
| 2015/0193297 | A1 | 7/2015 | Ngo et al. |
| 2015/0193298 | A1 | 7/2015 | Ngo et al. |
| 2015/0193321 | A1 | 7/2015 | Ngo et al. |
| 2015/0193373 | A1 | 7/2015 | Ngo et al. |
| 2016/0050513 | A1 | 2/2016 | Wang et al. |
| 2016/0124892 | A1 | 5/2016 | Amarilio et al. |
| 2017/0255250 | A1 | 9/2017 | Ngo et al. |
| 2017/0255578 | A1 | 9/2017 | Ngo et al. |
| 2017/0255579 | A1 | 9/2017 | Ngo et al. |
| 2017/0277651 | A1 | 9/2017 | Ngo et al. |
| 2017/0286340 | A1 | 10/2017 | Ngo et al. |
| 2018/0217959 | A1 | 8/2018 | Ngo et al. |
| 2019/0250876 | A1 | 8/2019 | Amarilio et al. |
| 2020/0151131 | A1 | 5/2020 | Ngo et al. |
| 2020/0334185 | A1 | 10/2020 | Ngo et al. |
| 2020/0394046 | A1 | 12/2020 | Snelgrove et al. |

OTHER PUBLICATIONS

Non-Final Office Action for U.S. Appl. No. 14/659,379, dated Apr. 7, 2017, 37 pages.

Author Unknown, "1-Wire," Wikipedia, last modified Jan. 16, 2015, accessed Feb. 12, 2015, http://en.wikipedia.org/wiki/1-Wire, 4 pages.

Author Unknown, "DS1822: Econo 1-Wire Digital Thermometer," Maxim Integrated, 2007, 21 pages.

Author Unknown, "MAXIM 1-Wire® Tutorial," MAXIM, online audiovisual presentation, 17 slides, No Date, accessed Feb. 12, 2015, http://www.maximintegrated.com/products/1-wire/flash/overview/ (38 images of slides).

Awtry, Dan, et al., "Design Guide v1.0," Springbok Digitronics, Aug. 19, 2004, 96 pages.

Non-Final Office Action for U.S. Appl. No. 14/575,491, dated Nov. 30, 2017, 18 pages.

Non-Final Office Action for U.S. Appl. No. 14/659,292, dated Sep. 29, 2017, 27 pages.

Final Office Action for U.S. Appl. No. 14/659,292, dated Apr. 30, 2018, 24 pages.

Non-Final Office Action for U.S. Appl. No. 14/659,328, dated Sep. 8, 2017, 51 pages.

Final Office Action for U.S. Appl. No. 14/659,328, dated Mar. 20, 2018, 61 pages.

Notice of Allowance for U.S. Appl. No. 14/659,328, dated Jul. 2, 2018, 8 pages.

Non-Final Office Action for U.S. Appl. No. 14/659,355, dated Sep. 20, 2017, 32 pages.

Final Office Action for U.S. Appl. No. 14/659,355, dated Apr. 17, 2018, 11 pages.

Advisory Action for U.S. Appl. No. 14/659,355, dated Jul. 5, 2018, 3 pages.

Non-Final Office Action for U.S. Appl. No. 15/467,790, dated Jun. 28, 2018, 14 pages.

Ex Parte Quayle Action for U.S. Appl. No. 15/365,315, dated Jul. 26, 2018, 7 pages.

Final Office Action for U.S. Appl. No. 14/659,379, dated Oct. 18, 2017, 44 pages.

Advisory Action for U.S. Appl. No. 14/659,379, dated Feb. 26, 2018, 3 pages.

Notice of Allowance for U.S. Appl. No. 14/659,379, dated Mar. 20, 2018, 10 pages.

Non-Final Office Action for U.S. Appl. No. 14/659,371, dated Sep. 25, 2017, 23 pages.

Final Office Action for U.S. Appl. No. 14/659,371, dated May 3, 2018, 21 pages.

Advisory Action for U.S. Appl. No. 14/659,371, dated Aug. 1, 2018, 3 pages.

Non-Final Office Action for U.S. Appl. No. 14/659,292, dated Dec. 21, 2018, 23 pages.

(56) References Cited

OTHER PUBLICATIONS

Final Office Action for U.S. Appl. No. 14/659,292, dated Jun. 4, 2019, 24 pages.
Non-Final Office Action for U.S. Appl. No. 14/659,355, dated Oct. 12, 2018, 8 pages.
Final Office Action for U.S. Appl. No. 14/659,355, dated May 2, 2019, 8 pages.
Non-Final Office Action for U.S. Appl. No. 15/886,209, dated May 17, 2019, 7 pages.
Non-Final Office Action for U.S. Appl. No. 14/659,371, dated Feb. 26, 2019, 22 pages.
Non-Final Office Action for U.S. Appl. No. 15/365,295, dated Mar. 29, 2019, 15 pages.
Final Office Action for U.S. Appl. No. 15/365,295, dated Aug. 15, 2019, 11 pages.
Final Office Action for U.S. Appl. No. 15/467,790, dated Nov. 5, 2018, 15 pages.
Advisory Action for U.S. Appl. No. 15/467,790, dated Feb. 26, 2019, 3 pages.
Notice of Allowance for U.S. Appl. No. 15/467,790, dated May 20, 2019, 8 pages.
Non-Final Office Action for U.S. Appl. No. 15/443,236, dated Nov. 16, 2018, 19 pages.
Final Office Action for U.S. Appl. No. 15/443,236, dated May 30, 2019, 20 pages.
Notice of Allowance and Examiner-Initiated Interview Summary for U.S. Appl. No. 15/365,315, dated Sep. 14, 2018, 9 pages.
Notice of Allowance for U.S. Appl. No. 15/472,756, dated Aug. 8, 2018, 8 pages.
Notice of Allowance for U.S. Appl. No. 15/886,209, dated Sep. 11, 2019, 7 pages.
Notice of Allowance for U.S. Appl. No. 16/402,613, dated Nov. 4, 2019, 9 pages.
Notice of Allowance for U.S. Appl. No. 16/407,397, dated Nov. 12, 2019, 7 pages.
Advisory Action for U.S. Appl. No. 15/365,295, dated Nov. 6, 2019, 3 pages.
Corrected Notice of Allowance for U.S. Appl. No. 15/467,790, dated Aug. 15, 2019, 6 pages.
Corrected Notice of Allowance for U.S. Appl. No. 15/467,790, dated Aug. 28, 2019, 6 pages.
Notice of Allowance for U.S. Appl. No. 15/443,236, dated Sep. 24, 2019, 8 pages.
Notice of Allowance for U.S. Appl. No. 15/365,295, dated Feb. 25, 2020, 8 pages.
Awtry, Dan, "Transmitting Data and Power over a One-Wire Bus," Sensors, Feb. 1997, Dallas Semiconductor, 4 pages.
Non-Final Office Action for U.S. Appl. No. 16/736,164, dated Feb. 27, 2020, 7 pages.
Final Office Action for U.S. Appl. No. 16/736,164, dated Jun. 2, 2020, 7 pages.
Non-Final Office Action for U.S. Appl. No. 16/736,164, dated Sep. 21, 2020, 8 pages.
Notice of Allowance for U.S. Appl. No. 17/095,204, dated Mar. 17, 2022, 7 pages.
Non-Final Office Action for U.S. Appl. No. 17/102,510, dated Mar. 18, 2022, 12 pages.
Final Office Action for U.S. Appl. No. 16/736,164, dated Jan. 11, 2021, 10 pages.
International Search Report and Written Opinion for International Patent Application No. PCT/US2020/012702, dated Apr. 7, 2020, 17 pages.
Non-Final Office Action for U.S. Appl. No. 16/599,384, dated Aug. 24, 2020, 8 pages.
Final Office Action for U.S. Appl. No. 16/599,384, dated Dec. 1, 2020, 9 pages.
Non-Final Office Action for U.S. Appl. No. 16/549,116, dated Aug. 6, 2020, 9 pages.
Final Office Action for U.S. Appl. No. 16/549,116, dated Jan. 13, 2021, 9 pages.
Non-Final Office Action for U.S. Appl. No. 16/710,457, dated Aug. 28, 2020, 7 pages.
Author Unknown, "IEEE Standard for Reduced-Pin and Enhanced-Functionality Test Access Point and Boundary-Scan Architecture," IEEE Std 1149.7™—2009, Feb. 10, 2010, IEEE, 1037 pages.
Kawoosa, M.S. et al., "Towards Single Pin Scan for Extremely Low Pin Count Test," 2018 31st International Conference on VLSI Design and 2018 17th International Conference on Embedded Systems (VLSID), Jan. 6-10, 2018, Pune, India, IEEE, 6 pages.
Advisory Action for U.S. Appl. No. 16/736,164, dated Mar. 19, 2021, 3 pages.
Notice of Allowance for U.S. Appl. No. 16/736,164, dated Apr. 29, 2021, 8 pages.
Advisory Action for U.S. Appl. No. 16/549,116, dated Mar. 24, 2021, 3 pages.
Non-Final Office Action and Examiner-Initiated Interview Summary for U.S. Appl. No. 16/549,116, dated May 12, 2021, 10 pages.
Applicant-Initiated Interview Summary for U.S. Appl. No. 16/549,116, dated Aug. 18, 2021, 2 pages.
Notice of Allowance and Examiner-Initiated Interview Summary for U.S. Appl. No. 16/549,116, dated Sep. 14, 2021, 15 pages.
Non-Final Office Action for U.S. Appl. No. 17/095,204, dated Oct. 14, 2021, 8 pages.

* cited by examiner

MULTI-PROTOCOL BUS CIRCUIT

FIELD OF DISCLOSURE

The technology of the disclosure relates generally to a hybrid bus apparatus incorporating heterogeneous communication buses.

BACKGROUND

Mobile communication devices have become increasingly common in current society. The prevalence of these mobile communication devices is driven in part by the many functions that are now enabled on such devices. Increased processing capabilities in such devices means that mobile communication devices have evolved from being pure communication tools into sophisticated mobile multimedia centers that enable enhanced user experiences.

The redefined user experience requires higher data rates offered by wireless communication technologies, such as Wi-Fi, long-term evolution (LTE), and fifth-generation new-radio (5G-NR). To achieve the higher data rates in a mobile communication device, a radio frequency (RF) signal(s) may first be modulated by a transceiver circuit(s) based on a selected modulation and coding scheme (MCS) and then amplified by a power amplifier(s) prior to being radiated from an antenna(s). In many wireless communication devices, the power amplifier(s) and the antenna(s) are typically located in an RF front-end (RFFE) circuit communicatively coupled to the transceiver circuit(s) via an RFFE bus based on an RFFE protocol as defined in the MIPI® alliance specification for radio frequency front-end control interface, version 2.1 (hereinafter referred to as "RFFE specification").

In this regard, FIG. 1 is a schematic diagram of an exemplary RFFE bus apparatus 10 as defined in the RFFE specification. The RFFE bus apparatus 10 includes an RFFE master 12 coupled to a number of RFFE slaves 14(1)-14(M) over an RFFE bus 16. According to the RFFE specification, the RFFE bus 16 is a two-wire serial bus that includes a data line 18 and a clock line 20 for communicating a bidirectional data signal SDATA and a clock signal SCLK, respectively. The RFFE bus 16 operates at a first data rate.

However, not all communications require a two-wire serial bus like the RFFE bus 16. In some cases, a single-wire serial bus may be sufficient or even desired for carrying out certain types of communications between circuits. In this regard, FIG. 2 is a schematic diagram of an exemplary conventional hybrid bus apparatus 22 in which a single-wire bus (SuBUS) bridge circuit 24 is configured to bridge communications between the RFFE master 12 in FIG. 1 with one or more SuBUS slaves 26(1)-26(N). Common elements between FIGS. 1 and 2 are shown therein with common element numbers and will not be re-described herein.

The SuBUS bridge circuit 24 is coupled to the SuBUS slaves 26(1)-26(N) over a SuBUS 28 having a single data wire 30. Accordingly, the SuBUS 28 is configured to operate at a second data rate that can be faster or slower than the first data rate of the RFFE bus 16. The SuBUS bridge circuit 24 may be coupled to the RFFE master 12 via the RFFE bus 16. In this regard, the SuBUS bridge circuit 24 and the SuBUS slaves 26(1)-26(N) are also RFFE slaves, such as the RFFE slaves 14(1)-14(M) coupled to the RFFE master 12 in the RFFE bus apparatus 10 of FIG. 1.

Notably, the SuBUS 28 differs from the RFFE bus 16 in several aspects. First, the RFFE bus 16 includes the data line 18 and the clock line 20, while the SuBUS 28 includes only the single data wire 30. Second, the SuBUS bridge circuit 24 is configured to communicate with the SuBUS slaves 26(1)-26(N) based on SuBUS command sequences, which may be compatible but different from the RFFE command sequences communicated over the RFFE bus 16. In this regard, the SuBUS bridge circuit 24 may perform command conversion between the RFFE command sequences and the SuBUS command sequences to facilitate communications between the RFFE bus 16 and the SuBUS 28. Third, the RFFE bus 16 may be configured to operate at the first data rate and the SuBUS 28 may be configured to operate at the second data rate, which is different from the first data rate. In this regard, the SuBUS bridge circuit 24 may buffer SuBUS data payloads prior to communicating over the RFFE bus 16 to help compensate for a difference between the first data rate and the second data rate.

Besides the power amplifier(s) and the antenna(s), the SuBUS slaves 26(1)-26(N) can also include other types of active or passive circuits (e.g., audio circuits) that need to communicate with other types of masters via the SuBUS 28. Given that the SuBUS bridge circuit 24 in the conventional hybrid bus apparatus 22 is only capable of bridging the SuBUS slaves 26(1)-26(N) with a single RFFE master 12 based exclusively on the RFFE protocol, it may be necessary to employ additional SuBUS bridge circuits to bridge the SuBUS slaves 26(1)-26(N) to additional types of masters. As a result, the conventional hybrid bus apparatus 22 may occupy a larger footprint and/or become more expensive.

SUMMARY

Aspects disclosed in the detailed description include a multi-protocol bus circuit. The multi-protocol bus circuit includes multiple master circuits each configured to communicate a respective master bus command(s) via a respective one of multiple master buses based on a respective one of multiple master bus protocols, and a slave circuit(s) configured to communicate a slave bus command(s) via a slave bus based on a slave bus protocol that is different from any of the master bus protocols. To enable bidirectional bus communications between the master circuits and the slave circuit(s), the multi-protocol bus circuit further includes a multi-protocol bridge circuit configured to perform a bidirectional conversion between the slave bus protocol and each of the master bus protocols. As a result, it is possible to support bidirectional bus communications based on heterogeneous bus protocols with minimal impact on cost and/or footprint.

In one aspect, a multi-protocol bus circuit is provided. The multi-protocol bus circuit includes multiple master circuits each coupled to a respective on of multiple master buses. The multiple master circuits are each configured to communicate a respective one or more master bus commands based on a respective one of multiple master bus protocols. Each of the master bus protocols is different from at least another one of the master bus protocols. The multi-protocol bus circuit also includes one or more slave circuits each coupled to a slave bus. The slave circuits are each configured to communicate a respective one or more slave bus commands based on a slave bus protocol different from any of the master bus protocols. The multi-protocol bus circuit also includes a multi-protocol bridge circuit coupled to the master buses and the slave bus. The multi-protocol bridge circuit is configured to perform a bidirectional conversion between the slave bus protocol and each of the master bus protocols.

In another aspect, a multi-protocol bridge circuit is provided. The multi-protocol bridge circuit includes multiple master bus ports each coupled to a respective one of multiple master circuits configured to communicate a respective one or more master bus commands via a respective one of multiple master buses based on a respective one of multiple master bus protocols. Each of the master bus protocols is different from at least another one of the master bus protocols. The multi-protocol bridge circuit also includes a slave bus port coupled to one or more slave circuits. The slave circuits are each configured to communicate a respective one or more slave bus commands based on a slave bus protocol different from any of the master bus protocols. The multi-protocol bridge circuit also includes a control circuit. The control circuit is configured to perform a bidirectional conversion between the slave bus protocol and each of the master bus protocols.

Those skilled in the art will appreciate the scope of the disclosure and realize additional aspects thereof after reading the following detailed description in association with the accompanying drawings.

BRIEF DESCRIPTION OF THE DRAWINGS

The accompanying drawings incorporated in and forming a part of this specification illustrate several aspects of the disclosure and, together with the description, serve to explain the principles of the disclosure.

DETAILED DESCRIPTION

Figure 1:
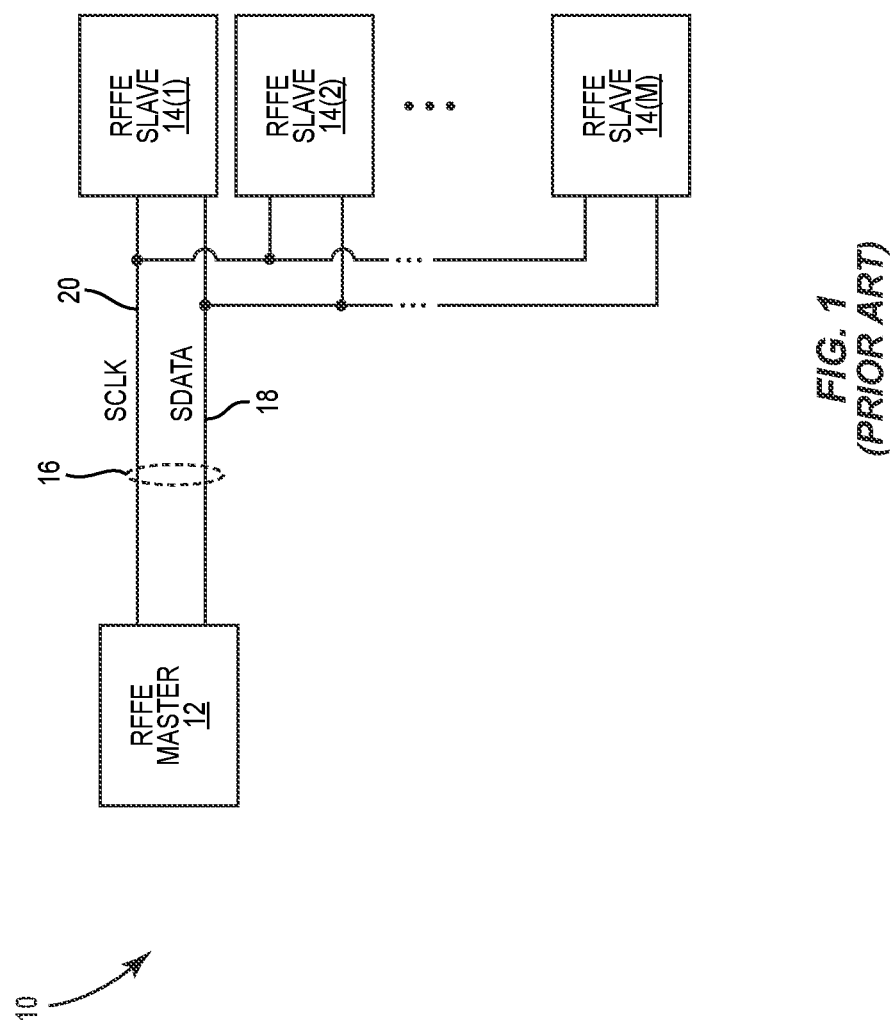
FIG. 1 is a schematic diagram of an exemplary radio frequency front-end (RFFE) bus apparatus as defined in the MIPI® alliance specification for radio frequency (RF) front-end control interface, version 2.1.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Aspects disclosed in the detailed description include a multi-protocol bus circuit. The multi-protocol bus circuit includes multiple master circuits each configured to communicate a respective master bus command(s) via a respective one of multiple master buses based on a respective one of multiple master bus protocols, and a slave circuit(s) configured to communicate a slave bus command(s) via a slave bus based on a slave bus protocol that is different from any of the master bus protocols. To enable bidirectional bus communications between the master circuits and the slave circuit(s), the multi-protocol bus circuit further includes a multi-protocol bridge circuit configured to perform a bidirectional conversion between the slave bus protocol and each of the master bus protocols. As a result, it is possible to support bidirectional bus communications based on heterogeneous bus protocols with minimal impact on cost and/or footprint.

Figure 3:
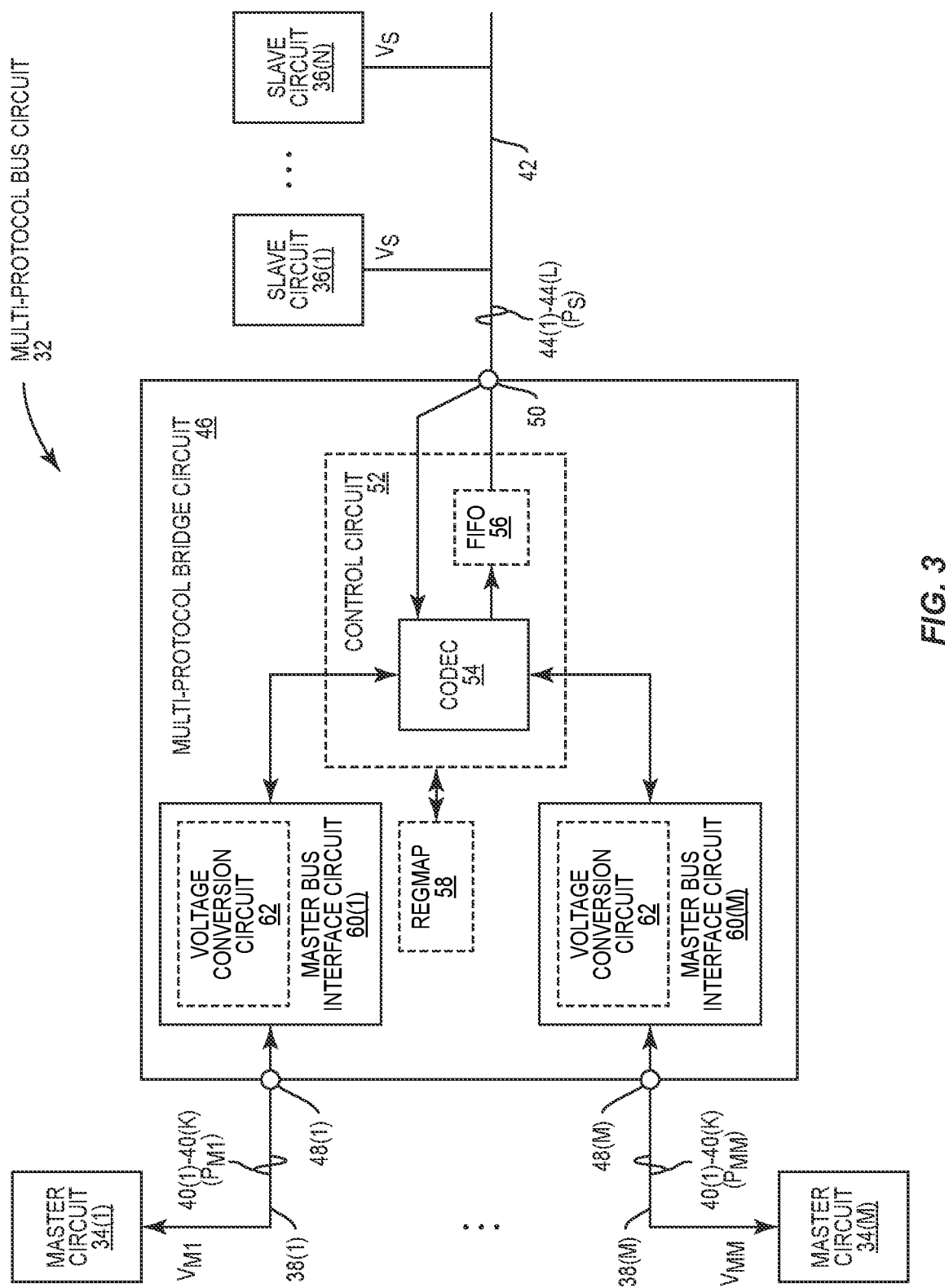
FIG. 3 is a schematic diagram of an exemplary multi-protocol hybrid bus apparatus configured according to embodiments of the present disclosure to support bidirectional bus communications between multiple master circuits and a slave circuit(s) based on heterogeneous bus protocols.

In this regard, FIG. 3 is a schematic diagram of an exemplary multi-protocol bus circuit 32 configured according to embodiments of the present disclosure to support bidirectional bus communications between multiple master circuits 34(1)-34(M) and one or more slave circuits 36(1)-36(N) based on heterogeneous bus protocols. Herein, the bidirectional bus communications refer to bus communications originated from any of the master circuits 34(1)-34(M) and destined to any of the slave circuits 36(1)-36(N) (a.k.a. forward communication), and bus communications originated from any of the slave circuits 36(1)-36(N) and destined to any of the master circuits 34(1)-34(M) (a.k.a. reverse communication).

The master circuits 34(1)-34(M) are coupled to multiple master buses 38(1)-38(M), respectively. Each of the master circuits 34(1)-34(M) is configured to communicate a respective one or more master bus commands 40(1)-40(K) based on a respective one of multiple master bus protocols $P_{M1}$-$P_{MM}$. In some embodiments, all of the master bus protocols $P_{M1}$-$P_{MM}$ are different bus protocols. In this regard, each of the master bus protocols $P_{M1}$-$P_{MM}$ is different from any other one of the master bus protocols $P_{M1}$-$P_{MM}$. In some other embodiments, only a subset of the master bus protocols $P_{M1}$-$P_{MM}$ are different bus protocols. In this regard, each of the master bus protocols $P_{M1}$-$P_{MM}$ is different from at least another one of the master bus protocols $P_{M1}$-$P_{MM}$.

Figure 2:
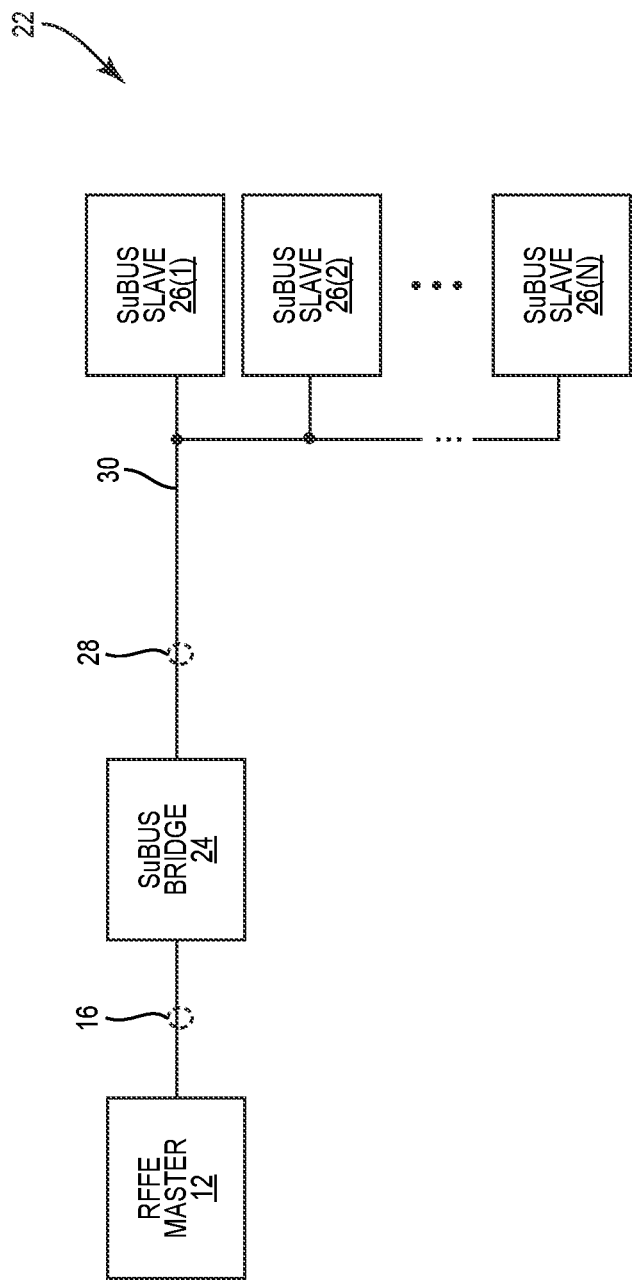
FIG. 2 is a schematic diagram of an exemplary conventional hybrid bus apparatus in which a single-wire bus (SuBUS) bridge circuit is configured to bridge communications between an RFFE master in the RFFE bus apparatus of FIG. 1 with one or more SuBUS slaves.

The slave circuits 36(1)-36(N) are each coupled to a slave bus 42 and configured to communicate a respective one or more slave bus commands 44(1)-44(L) based on a slave bus protocol $P_S$ that is different from any of the master bus protocols $P_{M1}$-$P_{MM}$. In a non-limiting example, the slave bus 42 is a single-wire bus (SuBUS) that is functionally equivalent to the SuBUS 28 in FIG. 2. Accordingly, each of the slave circuits 36(1)-36(N) can be functionally equivalent to the SuBUS slaves 26(1)-26(N) in FIG. 2.

To enable the bidirectional bus communications based on the heterogeneous bus protocols, the multi-protocol bus circuit is further configured to include a multi-protocol bridge circuit 46. In an embodiment, the multi-protocol bridge circuit 46 includes multiple master ports 48(1)-48(M), each coupled to a respective one of the master buses 38(1)-38(M). The multi-protocol bridge circuit 46 also includes a slave bus port 50 coupled to the slave bus 42. As discussed in further detail below, the multi-protocol bridge circuit 46 can be configured to perform a bidirectional conversion between the slave bus protocol $P_S$ and each of the master bus protocols $P_{M1}$-$P_{MM}$. Herein, the bidirectional conversion refers to converting the master bus commands 40(1)-40(K) from any of the master bus protocols $P_{M1}$-$P_{MM}$ into the slave bus commands 44(1)-44(L) in accordance with the slave bus protocol $P_S$, and vice versa. By bridging the master circuits 34(1)-34(M) with the slave circuits 36(1)-36(N) using the multi-protocol bridge circuit 46, it is possible to support bidirectional bus communications based on heterogeneous bus protocols with minimal cost and/or footprint impact on the multi-protocol bus circuit 32.

In an embodiment, the multi-protocol bridge circuit 46 includes a control circuit 52, which can be a field-programmable gate array (FPGA) or an application-specific integrated circuit (ASIC), as an example. To enable the forward communication, the control circuit 52 can be configured to receive the respective master bus commands 40(1)-40(K) from any of the master circuits 34(1)-34(M) via a respective one of the master ports 48(1)-48(M). Notably, the respective master bus commands 40(1)-40(K) may be destined to any of the slave circuits 36(1)-36(N) or to the multi-protocol bridge circuit 46 itself. In this regard, the control circuit 52 may be configured to first determine whether the respective master bus commands 40(1)-40(K) are destined to at least one of the slave circuits 36(1)-36(N). If the control circuit 52 determines that the respective master bus commands 40(1)-40(K) are indeed destined to any of the slave circuits 36(1)-36(N), the control circuit 52 will then convert the respective master bus commands 40(1)-40(K) into the respective slave bus commands 44(1)-44(L) and provide the respective slave bus commands 44(1)-44(L) to any of the slave circuits 36(1)-36(N) to which the respective master bus commands 40(1)-40(K) are destined.

To enable the reverse communication, the control circuit 52 is configured to receive the respective slave bus commands 44(1)-44(L) from any of the one or more slave circuits 36(1)-36(N) via the slave bus port 50. Notably, the respective slave bus commands 44(1)-44(L) may be destined to any of the master circuits 34(1)-34(M) or to the multi-protocol bridge circuit 46 itself. In this regard, the control circuit 52 may be configured to first determine whether the respective slave bus commands 44(1)-44(L) are destined to at least one of the master circuits 34(1)-34(M). If the control circuit 52 determines that the respective slave bus commands 44(1)-44(L) are indeed destined to any of the master circuits 34(1)-34(M), the control circuit 52 will then convert the respective slave bus commands 44(1)-44(L) into the respective master bus commands 40(1)-40(M) and provide the respective master bus commands 40(1)-40(M) to any of the master circuits 34(1)-34(N) to which the respective slave bus commands 44(1)-44(L) are destined.

In an embodiment, the control circuit 52 can include at least one encoder-decoder circuit 54 (denoted as "CODEC"). Specifically, the encoder-decoder circuit 54 can be configured to convert the respective master bus commands 40(1)-40(M) into the respective slave bus commands 44(1)-44(L) in the forward communication, and to convert the respective slave bus commands 44(1)-44(L) into the respective master bus commands 40(1)-40K) in the reverse communication.

In an embodiment, the multi-protocol bridge circuit 46 may simultaneously receive the respective master bus commands 40(1)-40(M) from more than one of the master circuits 34(1)-34(M). In this regard, upon converting the respective master bus commands 40(1)-40(M) received from each of the master circuits 34(1)-34(M) into the respective slave bus commands 44(1)-44(L), the control circuit 52 needs to determine an order for providing the respective slave bus commands 44(1)-44(L) to some or all of the slave circuits 36(1)-36(N).

For example, the control circuit 52 can provide the respective slave bus commands 44(1)-44(L), which are converted from the respective master bus commands 40(1)-40(M) received simultaneously from more than one of the master circuits 34(1)-34(M), to any of the slave circuits 36(1)-36(N) based on a predefined priority of the master circuits 34(1)-34(M). In this regard, the respective slave bus commands 44(1)-44(L) converted from the respective master bus commands 40(1)-40(M) received from a higher priority one of the master circuits 34(1)-34(M) will be sent to the slave bus port 50 before the respective slave bus commands 44(1)-44(L) converted from the respective master bus commands 40(1)-40(M) are received from a lower priority one of the master circuits 34(1)-34(M).

In a non-limiting example, the control circuit 52 can include a data buffer 56 that functions as a first-in first-out (FIFO) queue. In this regard, the control circuit 52 may be configured to enqueue the respective slave bus commands 44(1)-44(L) based on the predefined priority of the master circuits 34(1)-34(M). In other words, the control circuit 52 will enqueue the respective slave bus commands 44(1)-44(L) that are converted from the respective master bus commands 40(1)-40(M) received from the higher priority one of the master circuits 34(1)-34(M) in the data buffer 56 before enqueuing the respective slave bus commands 44(1)-44(L) that are converted from the respective master bus commands 40(1)-40(M) received from the lower priority one of the master circuits 34(1)-34(M).

In an embodiment, the data buffer 56 may be utilized only for the forward communication. As for the reverse communication, the respective slave bus commands 44(1)-44(L) received from any of the slave circuits 36(1)-36(N) are directly routed to the encoder-decoder circuit 54 from the slave bus port 50. Accordingly, the encoder-decoder circuit 54 is configured to convert the respective slave bus commands 44(1)-44(L) destined to any of the master circuits 34(1)-34(M) on a first come first serve basis.

In an embodiment, the multi-protocol bridge circuit 46 can include a storage circuit 58 (denoted as "REGMAP"), which can be a register bank, or a flash storage circuit, as an example. The storage circuit 58 may be programmed to store the predefined priority among the master circuits 34(1)-34(M).

As previously mentioned, the respective master bus commands 40(1)-40(K) originated from any of the master circuits 34(1)-34(M) can be destined to the multi-protocol bridge circuit 46, as opposed to any of the slave circuits 36(1)-36(N). In this regard, the respective master bus commands 40(1)-40(K), which are originated from any of the master circuits 34(1)-34(M) and destined to the multi-protocol bridge circuit 46, may be utilized to program (dynamically or statically) the predefined priority in the storage circuit 58.

In an embodiment, each of the master circuits 34(1)-34(M) may be configured to communicate the respective master bus commands 40(1)-40(K) by asserting a respective one of multiple master bus voltages $V_{M1}$-$V_{MM}$ on the respective one of the master buses 38(1)-38(M). In contrast, each of the slave circuits 36(1)-36(N) is configured to communicate the respective slave bus commands 44(1)-44(L) based on a slave bus voltage $V_S$ that is different from at least one of the master bus voltages $V_{M1}$-$V_{MM}$. Notably, any mismatch between the master bus voltages $V_{M1}$-$V_{MM}$ and the slave bus voltage $V_S$ can cause potential damage to the slave circuits 36(1)-36(N), particularly when the slave bus voltage $V_S$ is lower than any mismatched master bus voltage among the master bus voltages $V_{M1}$-$V_{MM}$.

In this regard, the multi-protocol bridge circuit 46 can be further configured to perform a bidirectional voltage conversion between the slave bus voltage $V_S$ and any of the master bus voltages $V_{M1}$-$V_{MM}$. In a non-limiting example, the multi-protocol bridge circuit 46 can further include multiple master bus interface circuits 60(1)-60(M), each coupled to a respective one of the master ports 48(1)-48(M). More specifically, each of the master bus interface circuits 60(1)-60(M) can include a respective voltage conversion circuit 62, which can be a capacitor-based or an inductor-based buck-boost converter, or a level shifter, as an example, for carrying out the bidirectional voltage conversion between the slave bus voltage $V_S$ and any of the master bus voltage $V_{M1}$-$V_{MM}$.

As a non-limiting example, the multi-protocol bridge circuit 46 can include a radio-frequency front-end (RFFE) master circuit (e.g., the master circuit 34(1)) and an inter-integrated circuit (I2C) master circuit (e.g., the master circuit 34(M)). In this regard, the RFFE master circuit 34(1) is configured to communicate one or more RFFE bus commands 40(1)-40(K) over the RFFE bus 38(1) based on an RFFE bus protocol and by asserting a respective one of the master bus voltage $V_{M1}$-$V_{MM}$ on the RFFE bus 38(1), and the I2C master circuit 34(M) is configured to communicate one or more I2C bus commands 40(1)-40(K) over the I2C bus 38(M) based on a I2C bus protocol and by asserting a respective one of the master bus voltage $V_{M1}$-$V_{MM}$ on the I2C bus 38(M). Each of the slave circuits 36(1)-36(N), on the other hand, is a SuBUS slave circuit configured to communicate the respective SuBUS slave bus commands 44(1)-44(N) over the SuBUS 42 based on the SuBUS protocol.

Accordingly, the multi-protocol bridge circuit 46 is configured to perform the bidirectional conversion between the RFFE bus protocol, the I2C bus protocol, and the SuBUS bus protocol. In addition, the multi-protocol bridge circuit 46 may also perform the bidirectional voltage conversion should there be a mismatch between the RFFE master bus voltage $V_{M1}$, the I2C master bus voltage $V_{MM}$, and the SuBUS slave bus voltage $V_S$.

The multi-protocol bridge circuit 46 can further include a second RFFE master circuit (e.g., the master circuit 34(2)), which is configured to communicate a respective one or more RFFE bus commands 40(1)-40(K) over a respective one of the master buses (e.g., the master bus 38(2)) based on the RFFE bus protocol. However, the second RFFE master circuit is configured to assert a different master bus voltage from the respective master bus voltage asserted by the RFFE master circuit 38(1).

Those skilled in the art will recognize improvements and modifications to the embodiments of the present disclosure. All such improvements and modifications are considered within the scope of the concepts disclosed herein and the claims that follow.

What is claimed is:

1. A multi-protocol bus circuit comprising:
   a plurality of master circuits each coupled to a respective one of a plurality of master buses and configured to communicate a respective one or more master bus commands based on a respective one of a plurality of master bus protocols, wherein each of the plurality of master bus protocols is different from at least another one of the plurality of master bus protocols;
   one or more slave circuits each coupled to a slave bus and configured to communicate a respective one or more slave bus commands based on a slave bus protocol different from any of the plurality of master bus protocols; and
   a multi-protocol bridge circuit coupled to the plurality of master buses and the slave bus and configured to perform a bidirectional conversion between the slave bus protocol and each of the plurality of master bus protocols.

2. The multi-protocol bus circuit of claim 1, wherein:
   the plurality of master circuits comprises:
     a radio-frequency front-end (RFFE) master circuit coupled to an RFFE bus and configured to communicate one or more RFFE bus commands based on an RFFE bus protocol;
     an inter-integrated circuit (I2C) master circuit coupled to a I2C bus and configured to communicate one or more I2C bus commands based on a I2C bus protocol;
   the one or more slave circuits comprise one or more single-wire bus (SuBUS) slave circuits each coupled to an SuBUS and configured to communicate a respective one or more SuBUS commands based on an SuBUS protocol; and the multi-protocol bridge circuit is coupled to the RFFE bus, the I2C bus, and the SuBUS and configured to perform the bidirectional conversion between the SuBUS protocol and each of the RFFE bus protocol and the I2C bus protocol.

3. The multi-protocol bus circuit of claim 1, wherein the multi-protocol bridge circuit is further configured to:
receive the respective one or more master bus commands from the respective one of the plurality of master circuits via the respective one of the plurality of master buses;
determine that the respective one or more master bus commands are destined to at least one of the one or more slave circuits;
convert the respective one or more master bus commands into the respective one or more slave bus commands of the at least one of the one or more slave circuits; and
provide the respective one or more slave bus commands to the at least one of the one or more slave circuits.

4. The multi-protocol bus circuit of claim 3, wherein the multi-protocol bridge circuit is further configured to:
receive the respective one or more slave bus commands from the at least one of the one or more slave circuits;
convert the respective one or more slave bus commands into the respective one or more master bus commands of the at least one of the plurality of master circuits; and
provide the respective one or more master bus commands to the at least one of the plurality of master circuits.

5. The multi-protocol bus circuit of claim 4, wherein the multi-protocol bridge circuit comprises at least one encoder-decoder circuit configured to:
convert the respective one or more master bus commands into the respective one or more slave bus commands of the at least one of the one or more slave circuits; and
convert the respective one or more slave bus commands into the respective one or more master bus commands of the at least one of the plurality of master circuits.

6. The multi-protocol bus circuit of claim 1, wherein the multi-protocol bridge circuit is further configured to:
receive concurrently the respective one or more master bus commands from each of the plurality of master circuits;
determine that the respective one or more master bus commands received from the each of the plurality of master circuits are destined to the at least one of the one or more slave circuits;
convert the respective one or more master bus commands received from the each of the plurality of master circuits into the respective one or more slave bus commands; and
provide the respective one or more slave bus commands to the at least one of the one or more slave circuits based on a predefined priority of the plurality of master circuits.

7. The multi-protocol bus circuit of claim 6, further comprising a data buffer coupled to the slave bus, wherein the multi-protocol bridge circuit is further configured to enqueue the respective one or more slave bus commands destined to the at least one of the one or more slave circuits in the data buffer based on the predefined priority of the plurality of master circuits.

8. The multi-protocol bus circuit of claim 6, wherein the multi-protocol bridge circuit further comprises a storage circuit configured to store the predefined priority of the plurality of master circuits.

9. The multi-protocol bus circuit of claim 8, wherein the multi-protocol bridge circuit is further configured to:

receive the respective one or more master bus commands from a respective one of the plurality of master circuits via the respective one of the plurality of master buses;
determine that the respective one or more master bus commands are destined to the multi-protocol bridge circuit; and
update the predefined priority stored in the storage circuit based on the respective one or more master bus commands.

10. The multi-protocol bus circuit of claim 1, wherein:
each of the plurality of master circuits is further configured to communicate the respective one or more master bus commands by asserting a respective one of a plurality of master bus voltages on the respective one of the plurality of master buses; and
the one or more slave circuits are each configured to communicate the respective one or more slave bus commands based on a slave bus voltage different from at least one of the plurality of master bus voltages.

11. The multi-protocol bus circuit of claim 10, wherein the multi-protocol bridge circuit is further configured to:
determine that the slave bus voltage is different from the at least one of the plurality of master bus voltages; and
perform bidirectional voltage conversion between the slave bus voltage and the at least one of the plurality of master bus voltages.

12. The multi-protocol bus circuit of claim 11, wherein the multi-protocol bridge circuit further comprises a plurality of master bus interface circuits each coupled to a respective one of the plurality of master circuits, and at least one of the plurality of master bus interface circuits is configured to perform the bidirectional voltage conversion between the slave bus voltage and the at least one of the plurality of master bus voltages.

13. The multi-protocol bus circuit of claim 11, wherein at least two of the plurality of master circuits are each configured to communicate the respective one or more master bus commands based on an identical one of the plurality of master bus protocols and by asserting a different one of the plurality of master bus voltages on the respective one of the plurality of master buses.

14. A multi-protocol bridge circuit comprising:
a plurality of master bus ports each coupled to a respective one of a plurality of master circuits configured to communicate a respective one or more master bus commands via a respective one of a plurality of master buses based on a respective one of a plurality of master bus protocols, wherein each of the plurality of master bus protocols is different from at least another one of the plurality of master bus protocols;
a slave bus port coupled to one or more slave circuits each configured to communicate a respective one or more slave bus commands based on a slave bus protocol different from any of the plurality of master bus protocols; and
a control circuit configured to perform a bidirectional conversion between the slave bus protocol and each of the plurality of master bus protocols.

15. The multi-protocol bridge circuit of claim 14, wherein the control circuit is further configured to:
receive the respective one or more master bus commands via the respective one of the plurality of master bus ports;
determine that the respective one or more master bus commands are destined to at least one of the one or more slave circuits;

convert the respective one or more master bus commands into the respective one or more slave bus commands; and provide the respective one or more slave bus commands to the slave bus port.

16. The multi-protocol bridge circuit of claim 15, wherein the control circuit is further configured to:

receive the respective one or more slave bus commands via the slave bus port;

convert the respective one or more slave bus commands into the respective one or more master bus commands; and provide the respective one or more master bus commands to at least one of the plurality of master bus ports.

17. The multi-protocol bridge circuit of claim 16, wherein the control circuit comprises at least one encoder-decoder circuit configured to:

convert the respective one or more master bus commands into the respective one or more slave bus commands; and convert the respective one or more slave bus commands into the respective one or more master bus commands.

18. The multi-protocol bridge circuit of claim 14, wherein the control circuit is further configured to:

receive concurrently the respective one or more master bus commands via each of the plurality of master bus ports;

determine that the respective one or more master bus commands are destined to at least one of the one or more slave circuits;

convert the respective one or more master bus commands received via the each of the plurality of master bus ports into the respective one or more slave bus commands; and provide the respective one or more slave bus commands to the slave bus port based on a predefined priority of the plurality of master circuits.

19. The multi-protocol bridge circuit of claim 18, wherein the control circuit further comprises a data buffer coupled to the slave bus port, wherein the control circuit is further configured to enqueue the respective one or more slave bus commands destined to the at least one of the one or more slave circuits in the data buffer based on the predefined priority of the plurality of master circuits.

20. The multi-protocol bridge circuit of claim 14, wherein:

each of the plurality of master circuits is further configured to communicate the respective one or more master bus commands by asserting a respective one of a plurality of master bus voltages on the respective one of the plurality of master buses; and the one or more slave circuits are each configured to communicate the respective one or more slave bus commands based on a slave bus voltage different from at least one of the plurality of master bus voltages.

* * * * *